United States Patent [19]

Nakamura et al.

[11] Patent Number: 5,049,621

[45] Date of Patent: Sep. 17, 1991

[54] PROCESS FOR PRODUCING BUTADIENE OLIGOMER ADDUCTS

[75] Inventors: Toru Nakamura; Hitoshi Yuasa, both of Yokohama, Japan

[73] Assignee: Nippon Oil Co., Ltd., Japan

[21] Appl. No.: 450,617

[22] Filed: Dec. 14, 1989

[30] Foreign Application Priority Data

Dec. 16, 1988 [JP] Japan .................. 63-317905

[51] Int. Cl.$^5$ .............. C08F 8/46; C08F 2/14
[52] U.S. Cl. .................. 525/266; 526/210; 106/14.11
[58] Field of Search .................. 525/266; 526/210

[56] References Cited

U.S. PATENT DOCUMENTS 3,935,173 1/1976 Ogasawara .................. 526/75

FOREIGN PATENT DOCUMENTS 2074583 11/1981 United Kingdom .

Primary Examiner—John C. Bleutge
Assistant Examiner—Vasu S. Jagannathan
Attorney, Agent, or Firm—Ostrolenk, Faber, Gerb & Soffen

[57] ABSTRACT

The present invention relates to a process for producing butadiene oligomer adducts of (A) a butadiene oligomer or co-oligomer prepared from a monomer, selected from conjugated diolefins and vinyl-substituted aromatic compounds, and butadiene with (B) an ethylene-α, β-dicarboxyl compound, characterized by heating (A) said butadiene oligomer or co-oligomer with (B) said compound at a temperature of 120°-220° C. in the presence of 0.005-5% by weight of trimethylhydroquinone based on an amount of (A). The adducts of the invention are useful, for instance, as a film-forming material for water-based coatings.

1 Claim, No Drawings

PROCESS FOR PRODUCING BUTADIENE OLIGOMER ADDUCTS

BACKGROUND OF THE INVENTION

1. Field of the Invention

This invention relates to a process for producing adducts of an ethylene-α, β-dicarboxyl compound with a butadiene oligomer or co-oligomer.

2. Description of the Prior Art

In order to use a resin as a film-forming material for water-based coatings, it is necessary to introduce generally hydrophilic groups such as carboxyl, hydroxyl, ether, amino, sulfonic acid and the like groups into the molecular structure of the resin. As a method for introducing carboxyl groups as hydrophilic groups into, for example, either drying oils containing conjugated double bonds such as tung oil, dehydrated castor oil, isomerized oil and the like, or drying oils containing non-conjugated double bonds such as linseed oil, soybean oil and the like, there is a method in which maleic anhydride is subjected to an addition reaction with respect to the above described drying oils, and the reaction product is then neutralized by the use of an alkali. These resulting products are widely used as malenized oil.

On one hand, it is well known to produce an adduct by treating thermally a butadiene oligomer or co-oligomer together with ethylene-α, β-dicarboxyl compound likewise in a method for introducing carboxyl groups into the butadiene oligomer or co-oligomer (Japanese Patent Publication No. 954/1971).

However, the adducts of a butadiene oligomer or co-oligomer with a ethylene-α, β-dicarboxyl compound exhibit remarkably increased viscosity during the addition reaction in comparison with these raw material polymers, and sometimes there is a case where the adducts develop into a gel. Furthermore, when an adduct has so excessively high viscosity, its water-solubilizing treatment becomes very difficult.

Accordingly, as a technically improved method to decrease viscosity of such adducts in a conventional production of the adducts of an ethylene-α, β-dicarboxyl compound with a butadiene oligomer or co-oligomer, it is well known to use a non-coloring stabilizer (French Patent No. 1332596), copper or a copper compound (Japanese Patent Publication Nos. 26870/1968 and 44557/1972), and an amine compound (West German Patent No. 2147639) as an anti-gelling agent for the charge stock, respectively.

However, such non-coloring stabilizers those described in French Patent No. 1332596 such as tertiary amylhydroquinone, hydroquinone, diphenylamine, 2,6-di-tert-4-methylphenol and the like involve such disadvantages that either air-drying of resulting coatings is significantly prevented or it is remarkably retarded even if such a stabilizer is added in a very small amount in case of a certain type of butadiene oligomer, and that the effect for reducing viscosity of adducts is poor in general.

Furthermore, when copper and copper compounds described in Japanese Patent Publication Nos. 26870/1968 and 44557/1972 are used, there are such disadvantages that the resulting adducts are remarkably colored, besides the rate of addition reaction being delayed, and that there is also a comparatively poor effect for decreasing viscosity of the adducts.

Still further, when amine compounds those described in West German Patent No. 2147639 are used, there are such disadvantages that the resulting adducts are remarkably colored, and in addition a scarce addition reaction arises at elevated temperatures in the vicinity of 200° C., and maleic anhydride reacts with such amine compound so that it produces by-products.

In addition, there is described in Japanese Patent Laid-open No. 83795/1974 that when a phenylenediamine derivative is employed, an adduct of low viscosity and having a good hue is obtained. It is, however, still desired to, attain much more improvement in the invention disclosed.

SUMMARY OF THE INVENTION

The present inventors have studied in detail a process for producing adducts of a butadiene oligomer or co-oligomer which has low viscosity and is easily handled with an ethylene-α, β-dicarboxyl compound. As a result, it was found that when the above described addition reaction was carried out in the presence of a particular compound, gelation of the charge stock could be completely prevented without any hindrance of the addition reaction, whereby such an adduct having lower viscosity and a better hue than those of other adducts prepared by utilizing well-known additives can be obtained, and this leads to completion of the present invention.

More specifically, the present invention relates to a process for producing butadiene oligomer adducts of (A) a butadiene oligomer or co-oligomer prepared from a monomer, selected from conjugated diolefins and vinyl-substituted aromatic compounds, and butadiene with (B) an ethylene-α, β-dicarboxyl compound, characterized by heating (A) said butadiene oligomer or co-oligomer with (B) said compound at a temperature of 120°–220° C. in the presence of 0.005–5% by weight of trimethylhydroquinone based on an amount of (A).

DESCRIPTION OF THE PREFERRED EMBODIMENTS

In the present invention, trimethylhydroquinone is used as an anti-gelling agent, whereby coloring of adducts of an ethylene-α, β-dicarboxyl compound with a butadiene oligomer or co-oligomer (hereinafter sometimes referred to as (co-)oligomer) is allowed to remarkably decrease, and at the same time increase in viscosity of the resulting adducts is prevented.

While viscosity of adducts of an ethylene-α, β-dicarboxyl compound with a butadiene (co-)oligomer varies depending upon the content of carboxyl group introduced and the molecular weight of said butadiene polymers, such carboxyl groups can be easily introduced also into butadiene polymers of high molecular weight in accordance with the present invention.

As the butadiene (co-)oligomers used in the present invention, there are butadiene polymers containing predominantly 1,2-double bonds, butadiene polymers containing predominantly 1,4-double bonds, and polymers containing both 1,2- and 1,4-double bonds which are produced in accordance with a heretofore well-known process, respectively. More specifically, typical polymers are obtained in accordance with a process for polymerizing butadiene alone or butadiene together with another monomer in the presence of a catalyst of an alkaline metal or an organic alkaline metal. In this case, typical polymerizing processes include living polymerization in tetrahydrofuran in order to obtain a light color polymer by controlling its molecular weight and decreasing gel content and the like, and chain transfer polymerization in which ethers such as dioxane and the like and alcohols such as isopropyl alcohol and the like are added to the system, and aromatic hydrocarbons such as toluene, xylene and the like are used a chain transfer agent or a solvent. In the present invention, oligomers obtained by these processes may be employed. Furthermore, in the present invention, such an oligomer containing predominantly 1, 4-double bonds of butadiene unit which is prepared by either polymerizing butadiene or copolymerizing butadiene with another monomer in the presence of a catalyst composed of the group VIII metal and an alkylaluminum halogenide may also be utilized.

The term "co-oligomer" used herein means an oligomer which is obtained by copolymerizing a conjugated diolefin other than butadiene such as isoprene, 2, 3-dimetylbutadiene, piperylene and the like, or a vinyl-substituted aromatic compound such as styrene, α-methylstyrene, vinyltoluene, divinylbenzene and the like as comonomer with butadiene. In this case, preferably used is a copolymer containing 50% or less of comonomer unit.

The oligomers and co-oligomers according to the present invention are those being in liquid or semisolid state at normal temperatures and having a number-average molecular weight of 200-10,000.

The ethylene-α, β-dicarboxyl compounds according to the present invention has the following general formula:

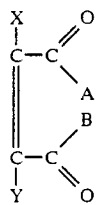

wherein X and Y be the same or different groups and which are hydrogen or alkyl group; and A and B are hydroxyl and alkoxyl group or —O— bond being formed integrally from A and B, and which includes maleic acid derivatives such as maleic anhydride, citraconic anhydride, 1, 2-diethylmaleic anhydride or the like, and maleic esters such as monomethyl maleate, dimethyl maleate, diethyl maleate or the like. In general, a compound having 12 or less carbon atoms is suitable for use in the present invention.

While the amount of an ethylene-α, β-dicarboxyl compound used is not specifically limited in the present invention, an addition reaction product having a ratio of addition, which will be calculated from the saponification value of the addition reaction product, of 50% by weight or less is used as a water-soluble or water-dispersible film-forming material, and in this case an addition reaction product containing 20% by weight or less ratio of addition of an ethylene-α, β-dicarboxyl compound is particularly preferred. In general, a higher ratio of addition of an ethylene-α, β-dicarboxyl compound results in the higher solubility of the product with respect to water so that viscosity of such product increases.

Although an amount of trimethylhydroquinone used as an anti-gelling agent is not particularly limited in the production of adducts of ethylene-α, β-dicarboxyl compounds with butadiene oligomers or co-oligomers, 0.005-5% by weight, preferably 0.05-2.0% by weight of trimethylhydroquinone is usually employed with respect to a butadiene (co-)oligomer.

In case of too small amount of trimethylhydroquinone, viscosity of said products increases remarkably, and sometimes it goes to the gel stage, whilst it is disadvantageous from economical point of view in case of an excessive amount of trimethylhydroquinone.

The temperature range is 120°−200° C., and preferably 150°−200° C. in the production of adducts of ethylene-α, β-dicarboxyl compounds with butadiene oligomers or co-oligomers in the presence of trimethylhydroquinone according to the present invention. In case of a low reaction temperature, a long period of time is required for completing the reaction, whilst the reaction completes in a short period of time in case of a high reaction temperature, but there is a fear of gelation. In the present invention, if a butadiene polymer has high viscosity, a diluent may also be used for the purpose of lowering the viscosity and smothering the addition reaction.

As such diluents, one which has a boiling point being equal to a prescribed temperature or higher than that, and is inert with respect to butadiene polymers, ethylene-α, β-dicarboxyl compounds, and trimethylhydroquinone, respectively, is used, and specifically petroleum fractions such as toluene, xylene, kerosine and the like are preferable.

A gas which does not react with butadiene polymers, ethylene-α, β-dicarboxyl compounds and trimethylhydroquinone is used as an inert gas for replacing a certain reaction system, and argon, nitrogen and the like are preferable as such inert gas.

An adduct of an ethylene-α, β-dicarboxyl compound with a butadiene (co-)oligomer prepared in the presence of trimethylhydroquinone according to the present invention has an appearance of colorless and light yellow, is in liquid or semisolid state in normal temperatures, and has a number-average molecular weight of 200-10,000. The resulting adduct has somewhat higher viscosity and lower iodine value than those of the raw material butadiene (co-)oligomer and exhibits a new acid value and saponification value corresponding thereto.

The addition products thus obtained may be used for film-forming materials of water-soluble coatings, electro-depositing coatings or emulsion coatings as well as modifiers and the like of a variety of plastics and rubbers dependent upon a degree of ratio of addition in an ethylene-α, β-dicarboxyl compound with respect to a certain butadiene polymer, existence of secondary chemical treatment as well as kind of the treatment.

EXAMPLES

The present invention will be described hereinbelow in more detail in conjuction with examples, but it is to be noted that the invention is not limited to only these examples.

EXAMPLE 1

1.5 l stainless steel autoclave equipped with a stirrer was charged with 800 parts by weight of NISSEKI Polybutadiene B-2000 (manufactured by Nippon Petrochemicals Co., Ltd. and having 1960 number-average molecular weight, 129 poise (25° C.) viscosity, 65% 1, 2-double bond, and 14% trans 1, 4-double bond), 80 parts by weight of xylene, 130 parts by weight of maleic anhydride, and 1.6 parts by weight of trimethylhydroquinone, and thereafter air in the system was sufficiently replaced by dry nitrogen, and heated to 195° C. This temperature was maintained for 5 hours after the bulk temperature reached 195° C., whereby an addition reaction of maleic anhydride and polybutadiene was effected. Xylene was distilled away from the reaction mixture at 150° C. under a reduced pressure of 1 mmHg to obtain a light colored adduct. The resulting adduct had an acid value of 81, a hue of 4 Gardner color scale, and viscosity at 25° C. of 30,000 poise.

COMPARATIVE EXAMPLE 1

As a result of effecting addition reaction without adding trimethylhydroquinone in Example 1, agitation became impossible after 1.5 hours from the point at which the temperature reaches 195° C. The autoclave was cooled and then opened, so that the gelled contents were observed.

COMPARATIVE EXAMPLE 2

Addition reaction was carried out with the use of N-phenyl-N'-isopropyl-p-phenylenediamine in place of trimethylhydroquinone in Example 1. The resulting adduct had an acid value of 81, a hue of 10 Gardner color scale, and viscosity at 25° C. of 40,000 poise. The hue of the product in this example was remarkably poor in comparison with that of Example 1.

EXAMPLES 2-4 AND COMPARATIVE EXAMPLES 3-8

A stainless steel autoclave having 500 ml internal volume and equipped with a stirrer was charged with 200 parts by weight of NISSEKI Polybutadiene B-1000 (manufactured by Nippon Petrochemicals Co., Ltd. and having 1000 number-average molecular weight, 42 poise (25° C.) viscosity, 60 % 1, 2-double bond, and 16% trans 1, 4-double bond), 10 parts by weight of xylene, 19.2 parts by weight of maleic anhydride, and 0.1-0.5 part by weight of trimethylhydroquinone or a conventional antioxidant with respect to 100 parts by weight of polybutadiene, and thereafter addition reaction was effected at 195° C. for 5 hours, and then xylene and a minor amount of unreacted maleic anhydride were distilled away at 150° C. under a reduced pressure of 1 mmHg to obtain an adduct. The results obtained are shown in the following Table 1.

As is apparent from Table 1, since the reaction product containing hydroquinone, 2, 5-di-tert-butylhydroquinone, or di-tert-butyl-p-cresol gelled, these antioxidants are not desirable, the reaction product containing tert-butylhydroquinone, or catechol exhibited a remarkable increase in viscosity, and further the reaction product containing p-tert-butylcatechol was poor in its reactivity so that a product having an expected acid value was not obtained.

EXAMPLE 5

2 l separable glass flask was charged with 1000 parts by weight of polybutadiene used in Exampless2-4, 163

TABLE 1

| | Various Additives | Amount Added (part)* | Reaction Time (hr) | Properties of Adduct Viscosity (Poise)/25° C. | Hue (Gardner) | Acid Value |
|---|---|---|---|---|---|---|
| Example 2 | Trimethylhydroquinone | 0.1 | 5 | 960 | 3 | 50 |
| Example 3 | Trimethylhydroquinone | 0.2 | 5 | 800 | 3 | 51 |
| Example 4 | Trimethylhydroquinone | 0.5 | 5 | 700 | 5 | 51 |
| Comp. Example 3 | Hydroquinone | 0.2 | 5 | gelled | — | — |
| Comp. Example 4 | tert-butylhydroquinone | 0.2 | 5 | 34,800 | 5 | 50 |
| Comp. Example 5 | 2,5-di-tert-butylhydroquinone | 0.2 | 5 | gelled | — | — |
| Comp. Example 6 | di-tert-butyl-p-cresol | 0.2 | 3 | gelled | — | — |
| Comp. Example 7 | p-tert-butylcatechol | 0.2 | 5 | 300 | 4 | 33 |
| Comp. Example 8 | catechol | 0.2 | 5 | >120,000 | 4 | — |

*Part by weight with respect to 100 parts by weight of polybutadiene.

parts by weight of maleic anhydride, and 2.0 parts by weight of trimethylhydroquinone, and then air in the system was sufficiently replaced by nitrogen, and thereafter 5% by weight of xylene was further added for the sake of flushing such maleic anhydride condensed in the upper part of the flask during the addition reaction into the system, and the addition reaction was effected at 190° C. for 4 hours. Unreacted maleic anhydride was distilled away together with xylene to obtain an adduct. The resulting adduct had an acid value of 80, a hue of 4 Gardner color scale, and viscosity at 25° C. of 900 poise. For the comparison, the addition reaction was carried out without adding trimethylhydroquinone. As a result, the resulting adduct gelled after the lapse of 1 hour.

COMPARATIVE EXAMPLE 9

Addition reaction was carried out with the use of N-phenyl-N'-isopropyl-p-phenylenediamine in place of trimethylhydroquinone in Example 5. The resulting adduct had an acid value of 80, a hue of 10 Gardner color scale, and viscosity at 25° C. of 900 poise.

What is claimed is:

1. A process for producing butadiene oligomer adducts of (A) a butadiene oligomer or co-oligomer prepared from a monomer selected from conjugated diolefins and vinyl-substituted aromatic compounds, and butadiene with (B) an ethylene-$\alpha$, $\beta$-dicarboxyl compound which has the following general formula:

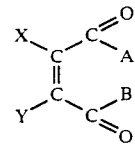

wherein X and Y may be the same or different groups and which are hydrogen or alkyl group; and A and B are hydroxyl and alkoxyl group or —O— bond being formed integrally from A and B which comprises a step of heating (A) said butadiene oligomer or co-oligomer with (B) said compound at a temperature of 120°–220° C. in the presence of 0.005–5% by weight of trimethylhydroquinone based on an amount of (A).

2. The process of claim 1 in which the amount of trimethylhydroquinone is 0.05–2%.

3. The process of claim 2 in which said temperature is 150–200° C.

4. The process of claim 3 in which A is butadiene and B is maleic anhydride.

5. The process of claim 1 in which A is butadiene and B is maleic anhydride.

* * * * *